Nov. 29, 1966     H. B. TAYLOR     3,288,258

TORQUE RELEASING CLUTCH MECHANISM

Filed Aug. 24, 1964     3 Sheets-Sheet 1

INVENTOR.

HUGH B. TAYLOR

BY David W. Tibbott

ATTORNEY

Nov. 29, 1966    H. B. TAYLOR    3,288,258
TORQUE RELEASING CLUTCH MECHANISM
Filed Aug. 24, 1964    3 Sheets-Sheet 2
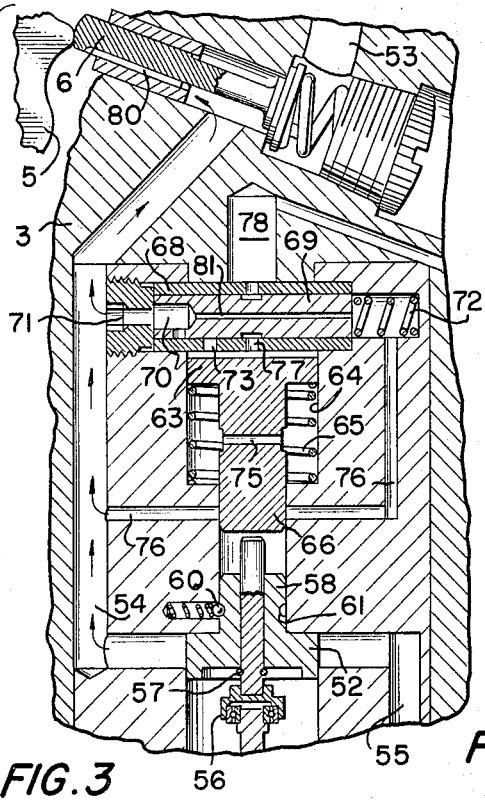
FIG. 3
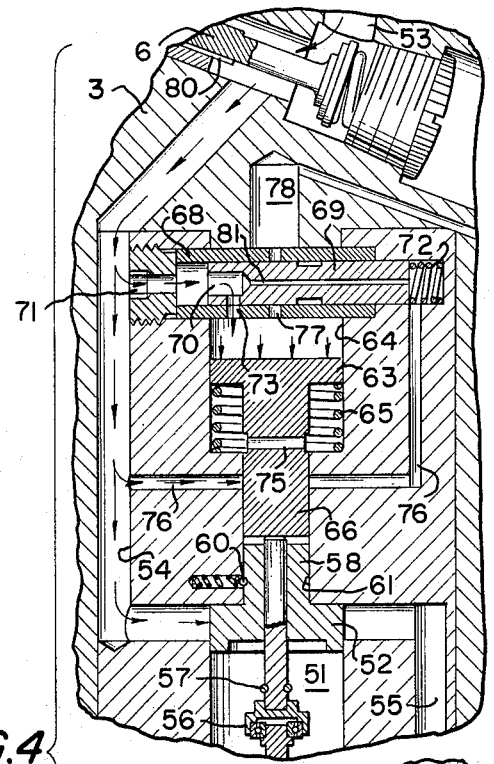
FIG. 4
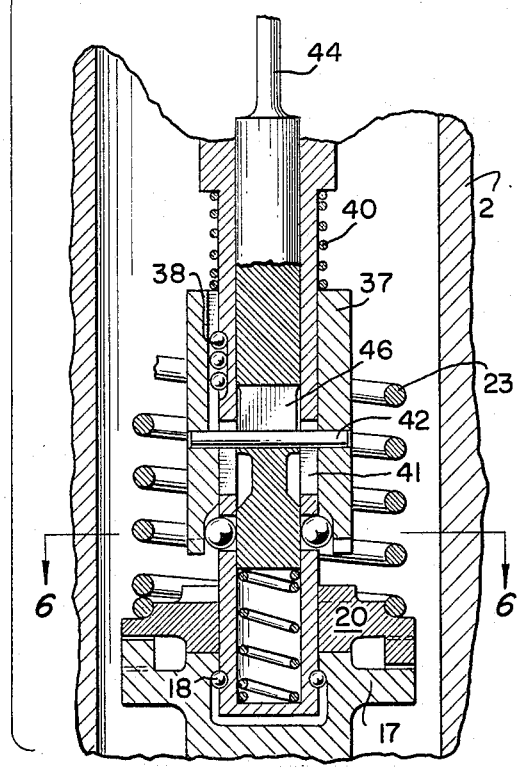
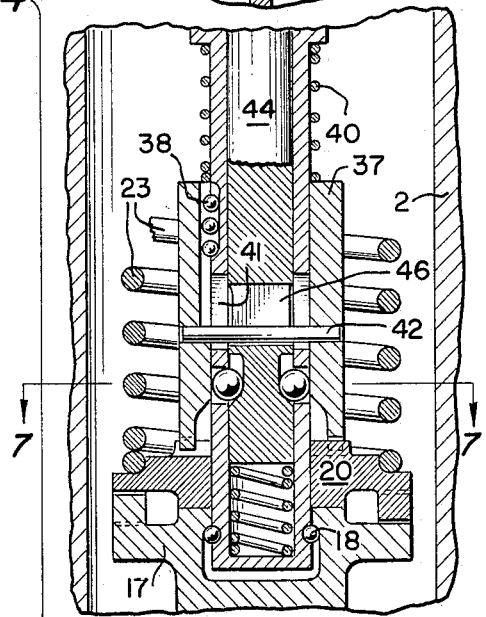
INVENTOR.
HUGH B. TAYLOR
BY
David W. Tillott
ATTORNEY Nov. 29, 1966  H. B. TAYLOR  3,288,258
TORQUE RELEASING CLUTCH MECHANISM
Filed Aug. 24, 1964  3 Sheets-Sheet 3

INVENTOR.
HUGH B. TAYLOR
BY
David W. Tibbott
ATTORNEY

3,288,258
TORQUE RELEASING CLUTCH MECHANISM
Hugh B. Taylor, Waverly, N.Y., assignor to Ingersoll-Rand Company, New York, N.Y., a corporation of New Jersey
Filed Aug. 24, 1964, Ser. No. 391,711
10 Claims. (Cl. 192—150)

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at relatively high speed; otherwise if the clutch releases relatively slowly, the operator receives an undesirable reaction while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable reaction torque on the operator.

In addition to the above problems, it is desirable that the tool does not cause the clutch to release prematurely during the initial starting and acceleration of the tool motor. This undesirable reaction often occurs in power-operated wrenches using clutches. This reaction is caused by the inertia of the tool drive train momentarily opposing the acceleration forces applied by the tool motor to place a momentary load on the clutch high enough to cause it to release.

Another problem found in power wrenches containing clutches is the tendency of the clutch to re-engage after the hand throttle is closed and before the tool motor comes to a stop. This action of the clutch is undesirable because it places high impact loads on the clutch which are likely to damage it. For example, this type of defective operation often results in the clutch teeth being chipped.

The principal object of this invention is to provide a torque release clutch mechanism having a relatively simplified structure of a novel type and which substantially eliminates or minimizes the foregoing problems.

Other important objects of this invention are: to provide a torque release clutch mechanism which releases itself under a selected torque load with the torque release being performed at a relatively high speed and being a complete torque release; to provide a torque release clutch mechanism which can be adjusted to release at a predetermined torque load; to provide a torque release clutch mechanism which rigidly transmits a torque load before it is released and which releases the transmission of torque compeltely after it opens; to provide a novel torque release clutch mechanism cooperating with a normally open motor valve which automatically closes and shuts off the motor in response to the release of the clutch mechanism; to provide a tool having a torque releasing clutch which does not prematurely release during the initial acceleration of the tool motor; and to provide a tool having a torque release clutch which does not prematurely re-engage itself after the throttle is closed and before the tool motor stops.

The invention is described in connection with the accompanying drawings wherein:

FIG. 1 is an elevational view with portions broken away of an angle wrench containing a torque release clutch embodying the concepts of this invention, the clutch being shown in its normally engaged position and the hand throttle of the tool being shown in an open position;

FIG. 2 is a fragmentary section with portions broken away showing the clutch and pneumatic actuator means of FIG. 1 on a larger scale and with the clutch initially released;

FIG. 3 is a fragmentary section similar to FIG. 2 showing the clutch fully released with the cam clutch plates re-engaged and with the throttle valve closed;

FIG. 4 is a fragmentary view similar to FIG. 2 showing the throttle valve reopened and the clutch re-engaged;

Figure 8:
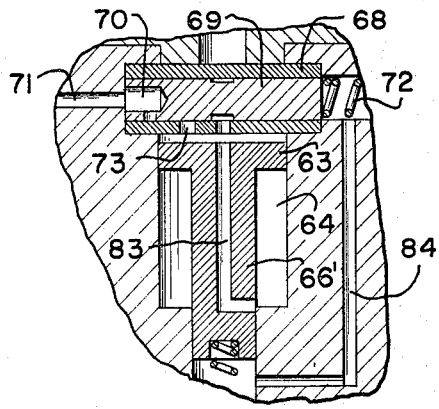
FIG. 8 is a fragmentary section of a modification in the clutch re-engagement means.

The pneumatic-powered angle wrench 1 shown in the drawings includes a casing 2 having a backhead 3 and a front nose 4. The backhead 3 carries a pivoted throttle lever 5 acting on a throttle valve stem 6. The depression of the throttle lever 5 opens the throttle valve 6 to feed pneumatic pressure to a rotary motor 7 contained in the casing 2. The front nose 4 carries a rotary spindle 8 having a square cross section and adapted to be connected to a conventional wrench socket (not shown) for driving nuts or bolts. The motor 7 drives the spindle 8 through a clutch mechanism 9 and a planetary gear train 10. This invention rests in the clutch mechanism 9, an automatic motor shut-off means, and a clutch re-engagement means.

Clutch mechanism

The motor 7 includes a rotor shaft 11 having a splined driving connection with the rear end of an elongated hollow main drive shaft 12. The rotor shaft 11 rotates in a ball bearing 14 mounted in the casing 2 at the rear end of the main drive shaft 12.

The planetary gears 10 include a sun gear 15 mounted in bearings 16 at the front end of the tool casing 2. The sun gear 15 is driven by an integral front clutch plate 17 which is rotatably mounted on the front end of the main drive shaft 12 by a thrust bearing 18. The thrust bearing 18 prevents the front clutch plate 17 from sliding axially forward off the end of the main drive shaft 12.

A second clutch plate 20 is rotatably and slidably mounted on the main drive shaft 12 immediately behind the front clutch plate 17. Both of the clutch plates 17 and 20 have interengaging cam teeth 21 having sloping sides which cooperate to cam the clutch plates 17 and 20 relatively apart when subjected to a torque load. The clutch plates 17 and 20 cooperate to form a "cam clutch 22" operative to separate under torque loads.

A heavy spring 23 is located on the main drive shaft 12 behind the second clutch plate 20 for engaging and urging the second clutch plate 20 against the front clutch plate 17. The spring 23 prevents the "cam clutch 22" from separating and releasing before the torque load on the "cam clutch 22" rises to a predetermined torque release value. The tension on the spring 23 determines the predetermined releasing torque load.

The rear end of the spring 23 abuts a washer 24 which is slidably keyed on the main drive shaft 12 by having a tang 25 sliding in a longitudinal keyway 26 formed in the main drive shaft 12. The washer 24 seats against a nut 27 threaded on the main drive shaft 12. A lock ring 28 is mounted on the main drive shaft 12 and serves to limit the rearward movement of the nut 27.

The nut 27 is screwed or turned on the main drive shaft 12 to adjust the tension on the spring 23 by a conventional geared chuck key 30. The rear face of the washer 24 carries gear teeth 31 adapted to interengage with the teeth 32 on the chuck key 30 and the periphery of the nut 27 contains a radial hole 33 adapted to receive the axle pin 34 on the geared chuck key 30 as shown in FIG. 1. When the geared chuck key 30 is located in the hole 33 in the position shown in FIG. 1 and turned, its teeth 32 force the washer 24 and the main drive shaft 12 to turn in the nut 27, thus adjusting the nut 27 and washer 24 on the main drive shaft 12. Obviously the movement of the washer 24 axially on the main drive shaft 12 serves to vary the tension on the spring 23.

The geared chuck key 30 is removed from the wrench 1 during the use of the wrench. The nut 27 is prevented from rotating relative to the washer 24 during operation of the wrench 1 by a detent ball 35 mounted in the inner face of the nut 27 and adapted to engage depressions in the rear face of the washer 24.

A clutch sleeve 37 is slidably mounted on the main drive shaft 12 behind the second clutch plate 20. The clutch sleeve 37 is keyed to the main drive shaft 12 by several key balls 38 rolling in corresponding longitudinal keyways provided in both the clutch sleeve 37 and the main drive shaft 12 so that the shaft 12 transmits torque to the clutch sleeve 37. The clutch sleeve 37 carries teeth 39 on its front end adapted to engage with corresponding teeth provided on the rear face of the second clutch plate 20. The teeth 39 have longitudinally extending sides so that a torque load on the clutch sleeve 37 and second clutch plate 20 does not create an axial force acting to thrust the clutch sleeve 37 rearwardly away from the second clutch plate 20. The clutch sleeve 37 is urged forwardly against the second clutch plate 20 by a light spring 40 encircling the main drive shaft behind the clutch sleeve 37.

The main drive shaft 12 is hollow or tubular and contains a pair of longitudinal slots 41 which are located diametrically opposite each other and under the clutch sleeve 37. A diametrical pin 42 is fixed to the clutch sleeve 37 and extends through the slots 41. The slots 41 are long enough to allow the clutch sleeve 37 and pin 42 to slide axially on the drive shaft 12 for a limited distance.

An actuator rod 44 is slidably mounted in the main drive shaft 12 and is urged rearwardly by a spring 45 located in the forward end of the drive shaft 12. The spring 45 is stronger than the light spring 40 so that the spring 45 is able to overcome the light spring 40 and urge the clutch sleeve 37 rearwardly against the force of the light spring 40. The actuator rod 44 contains a longitudinal slot 46 receiving the diametrical pin 42 so that the axial movement of the actuator rod 44 is transmitted to the clutch sleeve 37.

Means is provided for locking the actuator rod 44 against axial rearward movement under the force of the spring 45. This means includes a group of lock balls 47 seated in radial holes in the main drive shaft 12 and adapted to move radially inward into an annular groove 48 formed in the actuator rod 44 to prevent and lock it from moving rearward as shown in FIG. 1. The lock balls 47 are held in the annular groove 48 by the inner walls of the clutch sleeve 37 sliding forward over the lock balls 47. The lock balls 47 lock the actuator rod 44 in its forward position when the clutch sleeve 37 is moved forward engaging the second clutch plate 20, as shown in FIG. 1. This is the torque transmitting or engaged position of the clutch mechanism 9.

The interior of the clutch sleeve 37 is widened at its front end to form an annular rabbet 49 adapted to allow the lock balls 47 to move radially outward sufficiently to release the actuator rod 44 when the clutch sleeve 37 is moved axially rearward by the second clutch plate 20, as shown in FIG. 2, during the release of the clutch mechanism 9.

The slot 46 in the actuator rod 44 is of sufficient length to allow the clutch sleeve 37 to move relative to the actuator rod 44 far enough to release the lock balls 47. Once the lock balls 47 unlock the actuator rod 44, the spring 45 urges the actuator rod 44 rearward with enough force to move the clutch sleeve 37 further rearward.

The clutch mechanism 9 is in its engaged position in FIG. 1 and, in this position, will transmit a torque load until the load rises to a clutch-releasing value when the "cam clutch 22" will automatically open or separate against the spring 23. The separation of the "cam clutch 22" will move the clutch sleeve 37 rearward, as shown in FIG. 2, sufficiently for the clutch sleeve 37 to release the lock balls 47, allowing them to move outward into the annular rabbet 49. This action releases the actuator rod 44 which then is moved rearward by the spring 45 with enough force for the rod 44 to carry the clutch sleeve 37 rearward.

Automatic motor shut-off means

Means is provided for automatically shutting off the flow of pneumatic pressure to the tool motor 7 in response to the release of the clutch mechanism 9. The rear portion of the tool casing 2 contains an axial valve bore 51 containing a slidably mounted valve 52. In its open position, the throttle valve 6 admits air pressure from an inlet passage 53 to an intermediate passage 54 which opens into the valve bore 51 at a point where the valve 52 can alternately close or open the end of the intermediate passage. A motor passage 55 extends from the valve bore 51 to the motor 7 for carrying pressure fluid from the intermediate passage 54, when the valve 52 is open, to the motor 7. The motor passage 55 opens into the valve bore 51 at a point located diametrically opposite the intermediate passage 54.

The actuator rod 44 extends rearwardly in the tool body through an axial bore in the motor rotor 11 and is slidably mounted in an axial hole in the valve 52. A rotatable coupling 56 is interposed in the rear portion of the rod 44 to allow the front portion of the rod 44 to freely rotate relative to the rear portion. A snap ring 57 fits in a groove on the actuator rod 44 immediately ahead of the valve 52 to engage and move the valve 52 rearwardly with the rearward movement of the actuator rod 44 during the release of the clutch mechanism 9. The snap ring 57 is placed a slight distance forward of the valve 52 when the valve 52 is open to allow a small amount of "lost motion" of the rod 44 during its rearward movement before it engages and closes the valve 52.

The valve 52 includes a reduced diameter stem 58 sliding in an axial hole 59 of smaller diameter than the valve bore 51. The axial hole 59 contains a spring-pressed detent 60 adapted to seat in an annular groove 61 in the valve stem 58 to releasably detain the valve 52 in its closed position until it is forced back to its open position.

Valve re-engagement means

The valve 52 is returned to its open position by a piston 63 reciprocating in an axial cylinder 64 located behind the axial hole 59. The piston 63 is urged rearwardly by a spring 65 located in the cylinder 64 and includes an integral piston nose 66 extending forward and sliding in the axial hole 59. The admission of air pressure into the cylinder 64 behind the piston moves it forward to first engage and move the actuator rod 44 forward sufficient to allow the lock balls 47 to drop into the annular groove 48 in rod 44, as shown in FIG. 4. At this time, the clutch 37 is released and is returned to engaged position with the second clutch plate 20 by the light spring 40. All of this occurs before the motor valve 52 is opened.

Figure 5:
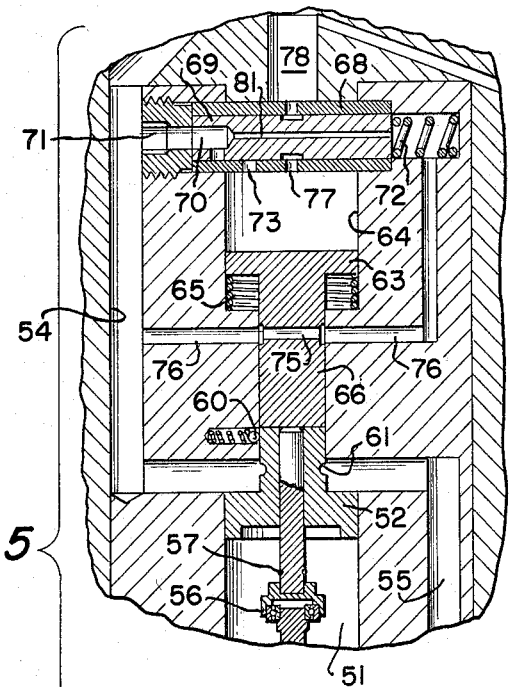
FIG. 5 is a fragmentary section similar to FIG. 2 showing the clutch re-engaged and the automatic motor shut-off valve after it is reopened to feed air pressure to the tool motor.
Figure 6:
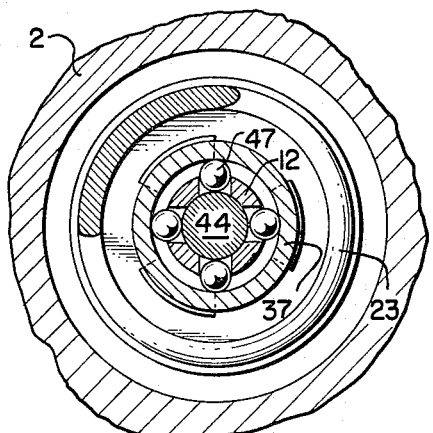
FIG. 6 is a section taken on line 6—6 of FIG. 3.
Figure 7:
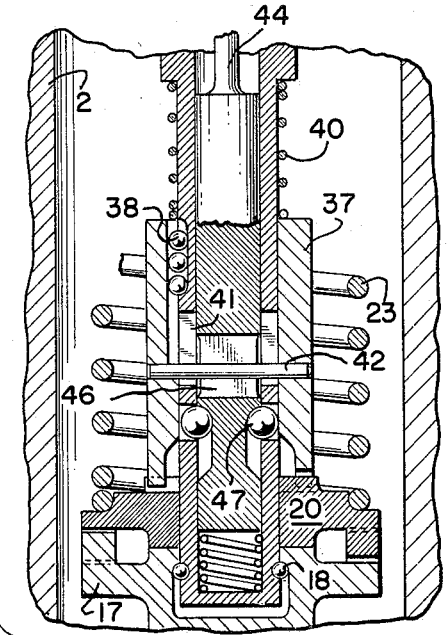
FIG. 7 is a section taken on line 7—7 of FIG. 4.
Figure 7:
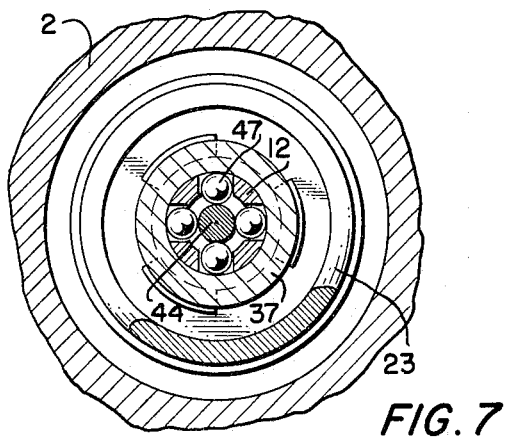

Continued forward movement of the piston 63 brings it into engagement with the valve 52 which is thereafter forced forward to its open position, as shown in FIG. 5. The piston 63 provides sufficient force to the valve 52 for it to be released by the spring-pressed detent 60 during the opening movement of the valve 52.

Means is provided for causing the piston 63 to move forward in response to the opening of the throttle valve 6. As soon as the piston 63 completes its forward stroke, it is allowed to return to its retracted position.

A valve tube 68 is mounted in the backhead 3 behind the cylinder 64 and contains a sliding spool valve 69. Looking at FIG. 4, an inlet end 70 of the spool valve 69 is connected by an inlet port 71 to the intermediate air passage 54. A spring 72 located at the other end of the spool valve 69 urges the spool valve toward the inlet port 71. As a result of this construction, air pressure is admitted to the inlet end 70 of the spool valve 69 when the throttle valve 6 is open.

When the spool valve 69 is moved to the right by the admission of air pressure through the inlet port 71, as shown in FIG. 4, the inlet end 70 of the spool valve opens a port 73 which admits air pressure from the inlet end 70 of the spool valve 69 to the cylinder 64. This air pressure forces the piston 63 forward to the end of its forward stroke.

The piston 63 contains a cross-port 75 which interconnects with an equalizing passage 76 when the piston 63 reaches the end of its forward stroke. The equalizing passage 76 runs from the intermediate passage 54 to the remote end of the valve tube 68 holding the spring 72. As a result, when the piston 63 reaches the front end of its stroke, the cross-port 75 opens the equalizing passage 76 which then feeds air pressure to the remote end of the spool valve 69 to equalize the pressure at the inlet end 70 of the spool valve 69. As soon as the pressure on both ends of the spool valve 69 is equalized, the spool valve 69 is forced by the spring 72 to return to its original retracted position wherein the port 73 is closed.

In its retracted position as shown in FIG. 5, the spool valve 69 opens a vent port 77 leading from the piston cylinder 64 to an exhaust conduit 78. The air pressure in the cylinder 64 is vented and the piston 63 is returned to its retracted position by its spring 65. Thus, the piston 63 is driven through a forward stroke and then retracted when the air pressure is exhausted from the intermediate passage 54 and thereafter again applied to it. This occurs when the throttle valve 6 is closed and then reopened.

Means is provided for exhausting the intermediate passage 54 and its connected passages when the throttle valve 6 is closed. Looking at FIG. 3, the throttle valve 6 includes a longitudinal vent groove 80 which is arranged to vent the intermediate passage 54 when the throttle valve 6 is closed. The spool valve 69 is provided with an axial bleed hole 81 for exhausting the remote end of the spool valve 69 when its inlet end 70 is vented.

*Operation*

Initially, the description of the operation of the wrench 1 will begin with the tool in the condition shown in FIG. 1. The throttle valve 6 is open, the shut-off valve 52 is open and the motor 7 is operating. The clutch 9 is engaged and transmitting the torque of the motor 7 to the wrench spindle 8. Although the drawing does not show it, the spindle is assumed to be connected to a conventional wrench socket driving a fastener. The clutch is adjusted to release under a predetermined selected torque load. The clutch will remain engaged so long as the torque load on the clutch does not rise to the selected predetermined torque load. This predetermined torque load is selected by adjusting the tension on the heavy spring 23 using the geared chuck key 30.

When the torque load on the clutch 9 rises to the clutch releasing torque load, the "cam clutch 22" separates as shown in FIG. 2. The separation of the cam clutch 22 forces the clutch sleeve 37 axially rearward until the lock balls 47 are free to move radially outward into the annular rabbet 49 in the sleeve 37. This outward movement of the lock balls 47 releases the actuator rod 44 which is then forced axially rearward by the spring 45. The rearward movement of the actuator rod carries the clutch sleeve 37 further rearward until the actuator rod 44 fully closes the shut-off valve 52, as shown in FIG. 3. Meantime, the second clutch plate 20 returns to its seated position on the first or front clutch plate 17 and is disengaged from the clutch sleeve 37 so that the clutch mechanism 9 is now open or released.

The closing of the shut-off valve 52 shuts off the fluid pressure supply to the motor 7 which thereafter stops.

Sometime after the clutch 9 releases, the operator closes the throttle valve 6 as shown in FIG. 3. This may happen at any time after the clutch 9 releases and normally will occur soon after the release of the clutch. The throttle valve 6 is closed simply by the operator releasing the throttle lever 5 to allow it to rise to its normal inoperative position. When the throttle valve 6 closes, the vent groove 80 in the throttle valve stem is opened to exhaust the pressure in the intermediate passage 54 and connecting passages.

The clutch 9 remains in the released position and the valve 52 remains closed, as shown in FIG. 3, while the wrench 1 is stopped or inactive. This is true whether or not the wrench 1 is used immediately thereafter or placed aside for a long period of time. Thus, the clutch cannot re-engage itself while the wrench motor is slowing down, immediately after the closing of the shut-off valve 52.

The clutch 9 is re-engaged and the shut-off valve 52 is reopened when the throttle valve 6 is again opened. The fluid pressure supplied to the intermediate passage 54 enters the inlet port 71 of the spool valve 69 and forces the spool valve 69 to the right as shown in FIG. 4. This movement of the spool valve 69 opens the port 73 to introduce pressure to the cylinder 64 and force the piston 63 axially forward.

The initial forward travel of the piston 63 forces the actuator rod 44 forward sufficiently for the clutch 9 to be re-engaged. Thus, the lock balls 47 return to the groove 48 in the rod 44 and the clutch sleeve 37 drops forward over the lock balls 47, as shown in FIG. 4.

Thereafter, the piston 63 forces the actuator rod 44 farther forward to open the valve 52 releasing the valve 52 from the detent 60. The opening of the valve 52 results in the fluid pressure in the intermediate passage 54 flowing to the motor passage 55 and driving the motor 7. It should be noted that the clutch 9 is engaged prior to starting the motor 7. Thus, the motor 7 cannot start before the clutch is engaged.

When the piston 63 reaches the front end of its stroke, the cross-port 75 opens the equalizing passage 76 to feed fluid pressure to the end of the valve tube 68 holding the spring 72, which then returns the spool valve 69 to the left end of its travel as shown in FIG. 5. The return of the spool valve 69 vents the cylinder 64 and the piston 63 is retracted by its spring 65. This position of the wrench is shown in FIG. 1. Thereafter, the wrench operates until the clutch 9 is again released as the result of the torque on the clutch 9 rising to the clutch releasing torque load.

*Second embodiment*

A modification of the means for re-engaging the clutch mechanism 9 is shown in FIG. 8. In this embodiment, the piston 63' contains a passage 83 running from the top of the piston to the side of the piston nose 66' and arranged to connect with a valve balancing passage 84 when the piston 63' reaches the front end of its stroke. The valve balancing passage 84 runs to the remote end of the tube 68, holding the spring 72, and takes the place of the equalizing passage 76 used in the first embodiment. In other words, the second embodiment takes the air pressure from the piston cylinder 64 to balance the spool valve 69, instead of taking air pressure from the intermediate passage 54 to do the same thing.

Although this application describes several embodiments, it should be recognized that the invention is not limited merely to these embodiments, but contemplates other embodiments and variations which utilize the concepts and teachings of the invention.

Having described my invention, I claim:

1. A torque-releasing clutch comprising:
   (a) a pair of clutch elements slidably mounted relative to each other;
   (b) means interengaging said clutch elements for transmitting torque and adapted to move said clutch elements relatively apart in response to a predetermined torque load;
   (c) a third clutch element arranged to be drivingly engaged with one of said clutch elements in a driving position;
   (d) said third clutch element being slidably mounted relative to said pair of clutch elements and arranged for movement from said driving position toward a released position by said pair of clutch elements moving relatively apart in response to said predetermined torque load;
   (e) first resilient means urging said third clutch element toward said released position; and
   (f) lock means normally preventing said first resilient means from acting on said third clutch element and operative to release said first resilient means in response to the movement of said third clutch element toward said released position whereby said first resilient means can force said third clutch element to its released position and hold it there.

2. The torque releasing clutch of claim 1 including means for returning said third clutch element to its driving position wherein said first resilient means is prevented by said lock means from acting on said third clutch element.

3. The torque releasing clutch of claim 2 including second resilient means urging said third clutch element toward its driving position and being weaker than said first resilient means whereby it can be overcome by said first resilient means.

4. A power wrench containing a torque responsive clutch, comprising:
   (a) fluid motor;
   (b) a torque responsive clutch drivingly connected to said motor and adapted to release itself in response to a predetermined torque load;
   (c) resilient means operative, when unlocked, to urge and move said clutch to its released position;
   (d) lock means normally preventing said resilient means from moving said clutch to its released position and operative in response to the releasing movement of said clutch to unlock said resilient means whereby it can move said clutch to its released position; and
   (e) actuator means operative to return said resilient means to its normal position wherein said lock means prevents it from moving said clutch to its released position.

5. The wrench of claim 4 wherein said actuator means is operated by fluid pressure.

6. The wrench of claim 5 wherein said wrench includes:
   (a) a throttle; and
   (b) said actuator means is operated by fluid pressure to return said resilient means to its normal position in response to the opening of said throttle.

7. The wrench of claim 6 including:
   (a) valve means for stopping the flow of fluid pressure to said motor; and
   (b) means connecting said actuator means to said valve means so that said actuator means closes said valve means in response to the release of said clutch.

8. The wrench of claim 7 wherein:
   (a) said actuator means is arranged to return said resilient means to its normal position so that said clutch is re-engaged before said valve means is opened.

9. The wrench of claim 8 wherein:
   (a) said actuator means includes:
       (1) a piston for causing said actuator means to return said resilient means to its normal position; and
       (2) means for operating said piston along its forward stroke in response to the opening of said throttle and thereafter immediately returning said piston along its reverse stroke.

10. A power wrench containing a torque responsive clutch, comprising:
    (a) a fluid motor;
    (b) a throttle for feeding fluid pressure to said motor;
    (c) a shut-off valve interposed between said throttle and said motor and adapted when closed to stop the flow of fluid pressure from said throttle to said motor;
    (d) a wrench spindle adapted to drive fasteners;
    (e) a torque responsive clutch drivingly connected between said motor and said spindle and adapted to release itself in response to a predetermined torque load;
    (f) an actuator means interconnecting said clutch and said shut-off valve for closing said valve in response to the release of said clutch; and
    (g) fluid-operated means for re-engaging said clutch and thereafter opening said shut-off valve in response to the opening of said throttle.

References Cited by the Examiner

UNITED STATES PATENTS

| | | | |
|---|---|---|---|
| 2,986,052 | 5/1961 | Eckman et al. | 192—150 X |
| 3,187,860 | 6/1965 | Simmons | 192—150 X |

DAVID J. WILLIAMOWSKY, *Primary Examiner.*

A. T. McKEON, *Assistant Examiner.*